Sept. 4, 1962  R. E. BLUNT ET AL  3,052,216
PROTECTIVE DEVICE FOR HORNED ANIMALS
Filed May 9, 1960
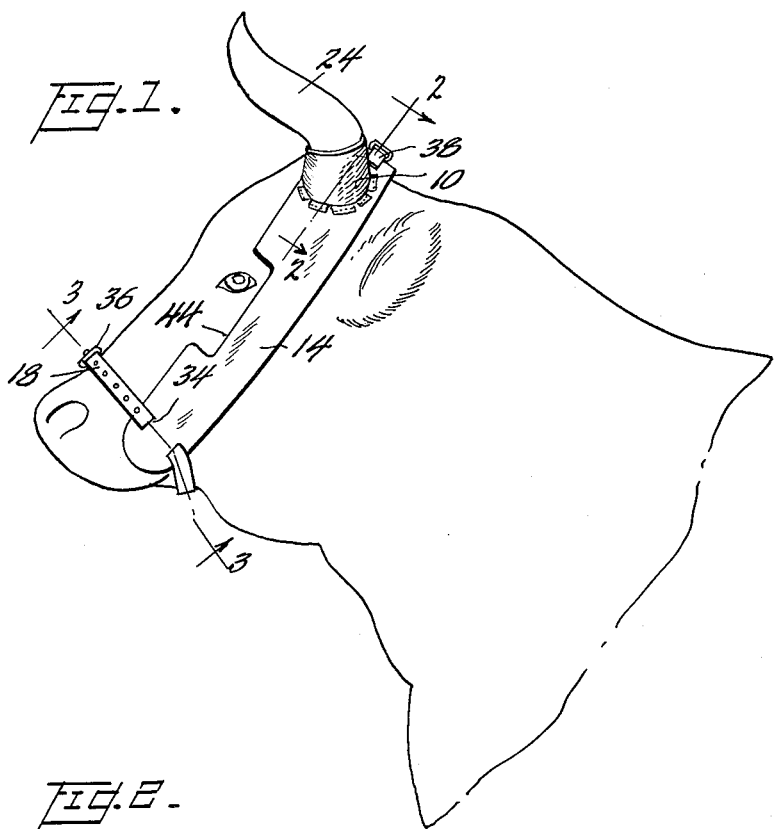
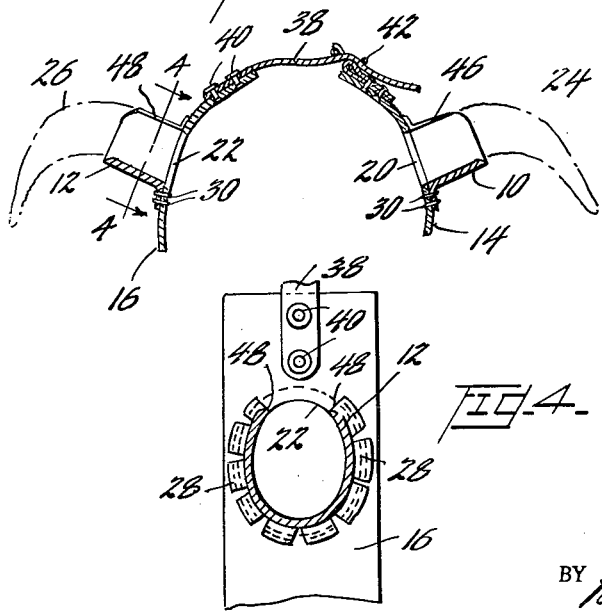
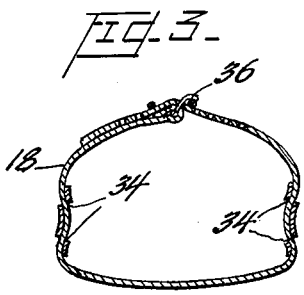
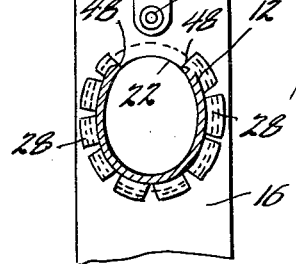
INVENTORS
Ray E. Blunt
Dewey I. David,
BY Parker and Walsh
ATTORNEYS 3,052,216
PROTECTIVE DEVICE FOR HORNED ANIMALS
Ray E. Blunt, Hartville, and Dewey I. David,
Guernsey, Wyo.
Filed May 9, 1960, Ser. No. 27,887
4 Claims. (Cl. 119—144)

This invention relates to a protective device for steers or other horned animals, and in particular those which are subjected to repeated roping by a lariat. This occurs, for instance, at rodeos and roundups, where the common way of securing the animal is by looping the rope around its horns. The resisting animal puts up a great struggle, and in this process there is a considerable amount of sliding of the rope across the horns. Since horns are made up of a relatively soft material this sawing action can be very damaging, even to the extent of loss of the horns, and therefore represents a serious problem.

It is, therefore, a principal object of the invention to prevent or minimize damage to animal horns by the action of lariats.

The foregoing and other objects, such as protection for the eyes of the animal are attained by the present invention which in brief comprises a bridle or headstall having sleeve elements adapted to cover the portion of the horns most likely to be affected.

For a more detailed description of the invention, reference is made to the accompanying specification, as illustrated in the drawings, in which:

FIGURE 1 is a side elevational view of a horned animal, such as a steer, with the protective bridle or headstall in place;

FIGURE 2 is a partial, sectional view taken on the line 2—2 of FIGURE 1;

FIGURE 3 is a sectional view taken on the line 3—3 of FIGURE 1; and

FIGURE 4 is a sectional view taken along the line 4—4 of FIGURE 2.

Referring to the drawings by characters of reference, there is shown, mounted on the head of a steer, a bridle of leather or equivalent tough and flexible material, which comprises a pair of split sleeves 10, 12, of generally frusto-conical form adapted to be received on an animal's horns in substantially mating relationship therewith. These sleeves achieve the principal result sought, which is that of protecting the horns, but they require means to secure them in place, and this is accomplished by further elements of the bridle, namely, side straps 14, 16, and a belt 18 which encircles the snout of the animal.

Side straps 14 and 16 are provided with openings 20, 22 to pass over the horns 24, 26 of the animal, and sleeves 10—12 are secured at their lower ends about the peripheries of these openings. For this purpose short, longitudinal slits are cut in the lower edges of the sleeves to provide tabs 28 which are bent outward, transversely to the sleeves to provide lower flanges which are secured by stitching 30 to the side straps.

To secure the protectors in place it is necessary to anchor the lower and upper ends of the side straps. The lower ends are secured by means of belt 18 passing through a pair of slits 34 in each side strap in interengaging relation therewith. Belt 18 is passed around the snout of the animal and secured by a buckle 36. The two upper ends of the side straps are secured by a strap 38 secured by rivets 40 to side strap 16, and secured to side strap 14 by means of a buckle 42 thereon.

Besides their function as carriers and anchoring means for the horn-protecting sleeves, the side straps afford a protection for the animal's eyes against damage by the rope. However, since the blinders are undesirable, the protecting straps are modified by providing recesses 44 in their side edges, intermediate their length, at the position of the animal's eyes. Of course, if side blinders are desirable for any reason, the side straps may be adjusted upward along the belt 18 until the line of vision is cut off to the degree desired.

It will be noted that the bases of sleeves 10, 12, do not take up the whole periphery of the openings 20, 22, and that the sleeves are split along one side as at 46, 48. This permits the sleeves to adapt readily with horns of lesser size without wrinkling or buckling, and openings 20, 22 will be sized to pass the largest size of horn which may be expected to be encountered.

Having thus described our invention, what we claim is:

1. A protective device for animals comprising a pair of straps of tough, flexible material, each having an opening at one end adapted to pass the horns of an animal, a split sleeve carried by each strap, being attached at one end to the periphery of said opening and extending transversely to said strap, disconnectible means for uniting the end of said strap adjacent said openings, and a loop means interengaging with the other end of said straps, and having adjustable means for snug engagement with the snout of an animal.

2. A protective device for animals comprising a pair of straps of tough, flexible material, each having an opening at one end adapted to pass the horns of an animal, a split sleeve carried by each strap, being attached at one end to the periphery of said opening and extending transversely to said strap, disconnectible means for uniting the ends of said straps adjacent said openings, and a loop means interengaging with the other ends of said straps, and having adjustable means for snug engagement with the snout of an animal, said straps each having a recess in its side edge intermediate its length for cooperation with the eyes of the animal.

3. A protective device for animals comprising a pair of straps of tough, flexible material, each having an opening at one end adapted to pass the horns of an animal, a split sleeve carried by each strap, being attached at one end to the periphery of said opening and extending transversely from said strap, cooperating tongues having buckle means on the ends of said straps adjacent said openings, said straps each having a pair of slits near their other ends, a belt having a buckle threaded in said slits, and said straps each having a lateral recess intermediate its ends for cooperation with the eyes of the animal.

4. A protective device for animals comprising a pair of strap of tough, flexible material, an open sleeve near the end of each strap extending outwardly from the surface thereof and adapted to receive the horn of an animal, coupling means on the ends of the straps adjacent said sleeves, and a belt interengaging with said straps at their other ends and adapted to surround the snout of the animal, said straps each having a recess in a side edge intermediate its ends for cooperation with the eyes of the animal.

References Cited in the file of this patent
UNITED STATES PATENTS

| | | |
|---|---|---|
| 669,909 | Young | Mar. 12, 1901 |
| 1,702,697 | Larson | Feb. 19, 1929 |
| 2,897,780 | Ayres | Aug. 4, 1959 |